(12) United States Patent
Park et al.

(10) Patent No.: US 10,381,868 B2
(45) Date of Patent: Aug. 13, 2019

(54) POWER METERING SYSTEM, LOAD POWER MONITORING SYSTEM USING THE SAME AND OPERATION METHOD THEREOF

(71) Applicant: LSIS CO., LTD., Gyeonggi-do (KR)

(72) Inventors: Hun Park, Gyeonggi-do (KR); Young-Gyu Yu, Gyeonggi-do (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 56 days.

(21) Appl. No.: 15/214,090

(22) Filed: Jul. 19, 2016

(65) Prior Publication Data
US 2017/0033600 A1 Feb. 2, 2017

(30) Foreign Application Priority Data
Jul. 28, 2015 (KR) .......................... 10-2015-0106911

(51) Int. Cl.
*H02J 13/00* (2006.01)
*G01D 4/00* (2006.01)
(Continued)

(52) U.S. Cl.
CPC .............. *H02J 13/00* (2013.01); *G01D 4/002* (2013.01); *G01D 4/004* (2013.01);
(Continued)

(58) Field of Classification Search
CPC ... H02J 3/383; H02J 7/35; H02J 13/00; G05B 23/0208; G01D 4/002; G01D 4/004
See application file for complete search history.

(56) References Cited

U.S. PATENT DOCUMENTS 5,563,802 A * 10/1996 Plahn ...................... H02J 9/062
290/1 R
9,118,211 B2 8/2015 Ichikawa
(Continued)

FOREIGN PATENT DOCUMENTS

CN 102435840 A 5/2012
CN 104272128 A 1/2015
(Continued)

OTHER PUBLICATIONS

Japanese Office Action dated Jul. 18, 2017 in connection with the counterpart Japanese Patent Application No. 2016-147561.
(Continued)

*Primary Examiner* — Nathan L Laughlin
(74) *Attorney, Agent, or Firm* — K&L Gates LLP

(57) ABSTRACT

In some embodiments, a load power monitoring system includes a distribution board to distribute a electric power applied from a external electric power supply source or a first renewable energy source to an electric device, at least one power metering device to sense electric energy of at least one of the electric power supply source and the first renewable energy source, a second power metering device to sense electric energy distributed to the electric device, a third power metering device to sense electric energy generated from a second renewable energy source, and a monitoring server to collect electric energy data sensed at each of the power metering devices and monitor the load power based on the collected electric energy data.

11 Claims, 9 Drawing Sheets

(51) Int. Cl.
*G05B 23/02* (2006.01)
*H02J 3/38* (2006.01)
*H02J 7/35* (2006.01)

(52) U.S. Cl.
CPC .......... *G05B 23/0208* (2013.01); *H02J 3/383* (2013.01); *H02J 7/35* (2013.01); *Y02B 70/3266* (2013.01); *Y02B 70/346* (2013.01); *Y02B 90/241* (2013.01); *Y02B 90/242* (2013.01); *Y02B 90/245* (2013.01); *Y04S 20/242* (2013.01); *Y04S 20/32* (2013.01); *Y04S 20/322* (2013.01); *Y04S 20/38* (2013.01); *Y04S 20/40* (2013.01); *Y04S 20/525* (2013.01)

(56) References Cited

U.S. PATENT DOCUMENTS

| | | | |
|---|---|---|---|
| 2009/0088991 A1* | 4/2009 | Brzezowski | G01D 4/00 |
| | | | 702/62 |
| 2011/0204720 A1* | 8/2011 | Ruiz | B60L 11/1816 |
| | | | 307/66 |
| 2012/0173034 A1 | 7/2012 | Taima | |
| 2012/0029023 A1 | 11/2012 | Kudo et al. | |
| 2013/0002190 A1* | 1/2013 | Ogura | H01M 10/44 |
| | | | 320/101 |
| 2013/0190937 A1* | 7/2013 | Navaratnarajah | G01D 4/004 |
| | | | 700/291 |
| 2013/0342018 A1* | 12/2013 | Moon | H02J 3/32 |
| | | | 307/80 |
| 2014/0025218 A1* | 1/2014 | Nishi | H02J 3/06 |
| | | | 700/295 |
| 2014/0084687 A1 | 3/2014 | Dent | |

FOREIGN PATENT DOCUMENTS

| | | |
|---|---|---|
| EP | 3 076 134 A1 | 10/2016 |
| JP | 2000-314752 A | 11/2000 |
| JP | 2001-268801 A | 9/2001 |
| JP | 2002-345156 A | 11/2002 |
| JP | 2012-29536 A | 2/2012 |
| JP | 2013-031243 A | 2/2013 |
| JP | 2013-213825 A | 10/2013 |
| JP | 2013-219935 A | 10/2013 |
| JP | 2014-011863 A | 1/2014 |
| JP | 2014-39352 A | 2/2014 |
| JP | 2016-893 A | 1/2016 |
| KR | 10-1015133 B1 | 2/2011 |
| KR | 10-2011-0057559 A | 6/2011 |
| KR | 10-1391876 B1 | 5/2014 |
| KR | 10-2014-0132523 A | 11/2014 |
| KR | 10-2015-0011224 A | 1/2015 |
| KR | 10-2015-0031926 A | 3/2015 |
| KR | 10-1516802 B1 | 5/2015 |
| KR | 10-1527194 B1 | 6/2015 |
| WO | 2014/143908 A1 | 9/2014 |
| WO | 2015/004893 A1 | 1/2015 |
| WO | 2015/083393 A1 | 6/2015 |

OTHER PUBLICATIONS

Search Report dated Dec. 6, 2016 issued in corresponding European Application No. 16 17 4413.
Office Action dated Nov. 18, 2016 issued in corresponding Korean Application No. 9-5-2016-083250775.
Yu Yixin, et al.; "Nonintrustive Residential Load Monitoring and Decomposition Technology"; Southern Power System Technology, China, 2013; vol. 7. No. 4; (5 pages).
Chinese Office Action for related Chinese Application No. 201610602841.9; action dated Sep. 5, 2018; (8 pages).

* cited by examiner (PRIOR ART)

POWER METERING SYSTEM, LOAD POWER MONITORING SYSTEM USING THE SAME AND OPERATION METHOD THEREOF

CROSS REFERENCE TO RELATED APPLICATIONS

This application claims the benefit of Korean Patent Application No. 10-2015-0106911, filed on Jul. 28, 2015 and entitled "POWER METERING SYSTEM, LOAD POWER MONITORING SYSTEM USING THE SAME AND OPERATION METHOD THEREOF", which is hereby incorporated by reference in its entirety into this application.

BACKGROUND

Technical Field

The present disclosure relates to a power metering system, a load power monitoring system using the same and an operation method thereof.

Description of the Related Art

As digital and network technologies evolve, home appliances and information appliances are equipped with a variety of functions in accordance with a trend toward convergence emerges. Such digital convergence devices are widely prevailing across homes or offices. However, due to convergence of functions and support of networking, such information appliances consume standby power while users are not aware of it, as well as electric power upon request from users.

Since users do not account for which device consumes how much electric power for a specific period, they are not even interested in saving electric energy.

In this regard, in order to monitor energy consumption per electronic device, there has been proposed a technique that analyzes and monitors the amount and pattern of electric power consumption per electric device for a predetermined period by using an electric meter measuring a total amount of electric energy to be consumed per home or building.

FIG. 1 is a block diagram of a typical load power monitoring system.

With reference to FIG. 1, in the typical load power monitoring system, electric power supplied from an external electric power supply source 1 to a home 3 may be supplied to electric home appliances, which are connected to electrical outlets, through a distribution board 2 provided at the home 3. In particular, the distribution board 2 is configured with a power metering device 4 for monitoring a usage state of electric power and electric energy consumption regarding how electric power supplied from the external electric power supply source 1 is used at the electric home appliances in the home 3.

The power metering device 4 may perform an individual monitoring through a remote server using electric energy consumption and usage pattern information of the electric home appliances.

Such a typical load monitoring system and a method thereof are difficult to sense electric energy additionally flowing from a power source or an energy source in addition to the external electric power supply source 1. Moreover, when a system is designed by adding a typical measuring device requiring high accuracy so as to sense electric energy which additionally flows into, there may cause problems such as an expensive system design cost and a large-scale system according to a configuration of an unnecessary device.

SUMMARY

To address the problems described above, some embodiments of the present disclosure provides a power metering system, a load power monitoring system using the same, and an operating method thereof capable of supplying energy to a load by adding a renewable energy source in addition to a typical external electric power supply source, and monitoring a consumption state with respect to energy being supplied to the load.

Also, to grasp an electric energy consumption and state with respect to a load and electric power supply devices, some embodiments of the present disclosure provides a power metering system, a load power monitoring system using the same, and an operating method thereof capable of monitoring a load power by configuring an effective system with a minimum cost.

Moreover, some embodiments of the present disclosure provides a power metering system of high reliability and high efficiency, a load power monitoring system using the same, and an operating method thereof capable of grasping electric energy consumption and a state with respect to a load and electric power supply devices.

In accordance with an embodiment of the present disclosure, the load power monitoring system includes an external electric power supply source, a first renewable energy source to charge or discharge electric power, a second renewable energy source to generate electric power, a distribution board to distribute the electric power applied from the external electric power supply source or the first renewable energy source to an electric device, at least one power metering device to sense electric energy of at least one of the electric power supply source and the first renewable energy source, a second power metering device to sense electric energy distributed to the electric device, a third power metering device to sense electric energy generated from the second renewable energy source, and a monitoring server to collect electric energy data sensed at each of the power metering devices and monitor the load power based on the collected electric energy data.

Also, in accordance with an embodiment of the present disclosure, a method for monitoring a load power includes collecting at least two electric energy data among a first electric energy data flowing from an external electric power source, a second electric energy data applied to an electric device, a third electric energy data of a first renewable energy source, and a fourth electric energy data of a second energy source; verifying the collected electric energy data; and estimating and verifying uncollected electric energy data and electric energy data of the renewable energy sources based on the collected electric energy data.

Moreover, in accordance with an embodiment of the present disclosure, a power metering system includes an external electric power supply source, a plurality of renewable energy sources, a distribution board to receive electric power from the external electric power supply source or the plurality of renewable energy sources, and to distribute the electric power to an electric device, a power metering device to sense electric energy data of the external electric power supply source or the plurality of renewable energy sources, and a second power metering device to sense electric energy distributed to the electric device.

As described above, the power metering device, the load power monitoring system using the same, and an operating method thereof have effectiveness in that high reliability and high performance system may be configured in a minimum cost and load electric energy may be effectively measured using the system

DETAILED DESCRIPTION

Hereinafter, a power metering device, and a load power monitoring system using the same and an operation method thereof will be described in detail.

Figure 1:
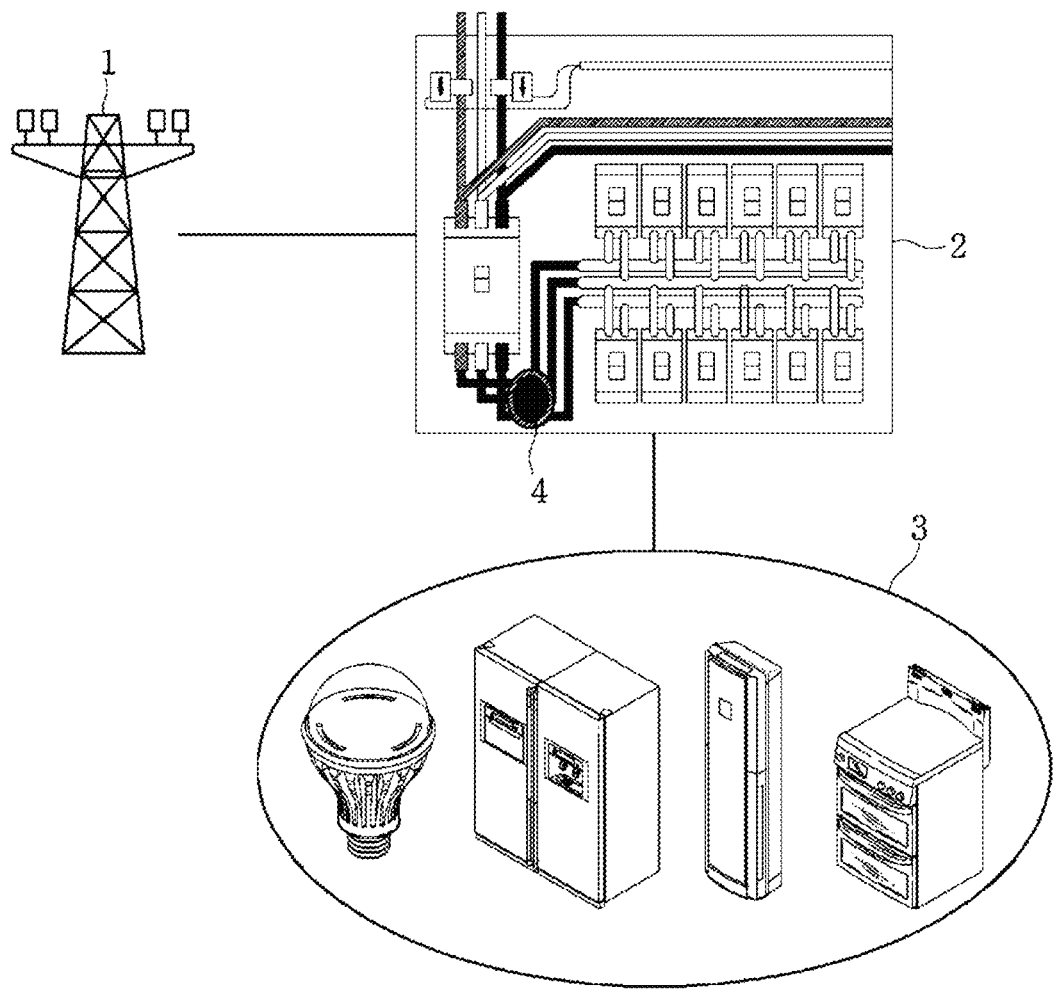
FIG. 1 is a block diagram of a typical load power monitoring system, according to the prior art.
Figure 2:
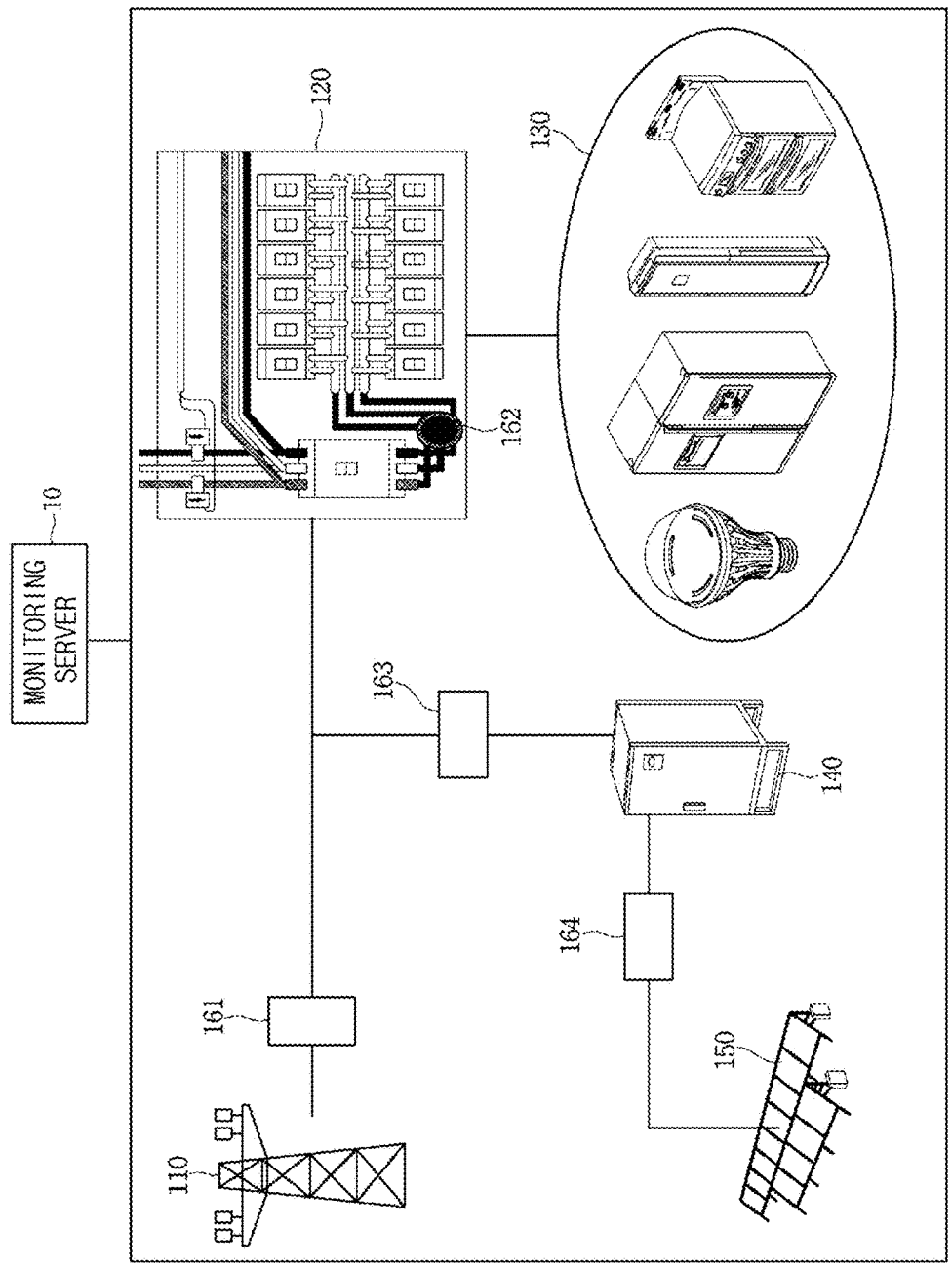
FIG. 2 is a block diagram of a load power monitoring system according to one embodiment of the present disclosure.

FIG. 2 is a block diagram of a load power monitoring system according to one embodiment of the present disclosure.

With reference to FIG. 2, a load power monitoring system according to an embodiment of the present disclosure includes a monitoring server 10, an external electric power supply source 110, a distribution board 120, an electric home appliance 130, a first renewable energy source 140, and a second renewable energy source 150. In particular, at one ends of the external electric power supply source 110, the distribution board 120, the first renewable energy source 140, and the second renewable energy source 150, power metering devices 161,162,163, and 164 for monitoring electric energy data input to or output from such equipment may be configured.

In an embodiment of the present disclosure, a renewable energy source may be configured in plural numbers and described as an example, and the first renewable energy source 140 of the renewable energy source will be described as an example of an energy storage device and the second renewable energy source 150 will be described an example of a solar power plant. The renewable energy sources are not limited thereto, and devices capable of generating, charging, and discharging electric power may be applicable.

The monitoring server 10 may obtain loads and electric energy data including electric energy consumption of a power source, an inflow amount of electric energy thereof, or an electric power consumption pattern, which are measured from the power metering devices 161, 162, 163, and 164. The monitoring server 10 may monitor and output electric power of a load based on the obtained data.

Figure 7:
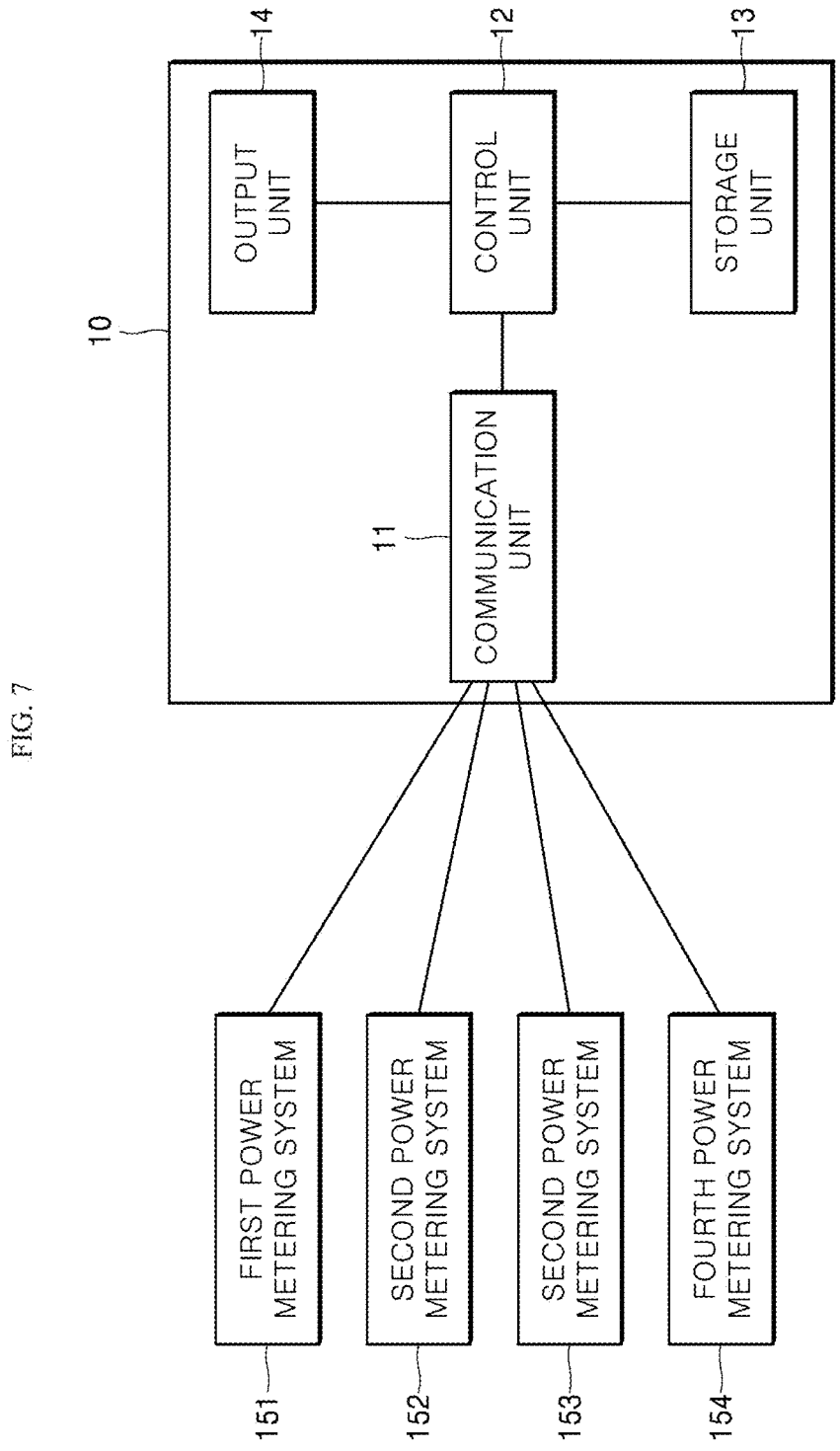
FIG. 7 is a block diagram of a monitoring server according to an embodiment of the present disclosure.

FIG. 7 is a block diagram of a monitoring server according to an embodiment of the present disclosure.

With reference to FIG. 7, a monitoring server 10 according to the present embodiment may be configured to include a communication unit 11, a controller 12, a storage unit 13, and an output unit 14.

The communication unit 11 may be configured with a wireless internet module using a wireless local arear network (WLAN), a Wi-Fi, a wireless broadband (Wibro), a world interoperability for microwave access (Wimax), and a high speed downlink packet access (HSDPA). Also, the communication unit 11 may be configured in a variety of forms such as a local area communication module, a wired communication module and the like in which a Bluetooth, a radio frequency identification (RFID), an infrared data association (IrDA), an ultra wideband (UWB), and a ZigBee may be used. The communication unit 11 may receive electric energy data from power metering devices 151, 151, 153, and 154.

The controller 12 may verify and analyze electric energy data, which is received through communication unit 11, of the power metering devices 161, 162, 163, and 164. The controller 12 may extract and process data regarding electric energy or electric power usage pattern according to the received electric energy data of the power metering devices 161, 162, 163, and 164. As an example, a non-intrusive load monitoring (NILM) algorithm may be performed to analyze the electric power usage pattern. Also, the controller 12 may control the storage unit 13 to store electric energy data and information regarding a power metering device corresponding to the electric energy data, or the output unit 14 to output them.

The storage unit 13 may store the electric energy data received through the communication unit 11. The storage unit 13 may store an algorithm which is to be executed in the controller 12 and to be used for analysis of an electric power usage pattern. An example of the storage unit 13 may include a storage medium of at least one type among a memory (for example, a secure digital (SD) memory, an extreme digital (XD) memory, or the like) of a flash memory type, a hard disk type, or a multimedia card micro type, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The output unit 14 may output the electric energy data and the analyzed data, which are received and processed from the power metering devices, in a variety of forms such as an image, an audio, or the like, under the control of the controller 12. An example of the output unit 14 may include a display unit, an audio output unit and the like.

In addition, a user input unit (not shown) may be configured, and the server 10 may be controlled or electric energy data of a monitored load may be output on the basis of an input of the user input unit.

As described above, a configuration for obtaining electric energy data being processed in the server 10 may include the external electric power supply source 110, the distribution board 120, the electric home appliance 130, and the multiple renewable energy sources 140 and 150.

The external electric power supply source 110 may be an external power source such as a power plant, and electric power flowing from the external electric power supply source 110 may be supplied to a variety of loads including the indoor electric hone appliances 130 through the distribution board 120. Also, electric power of the external electric power supply source 110 may be supplied to the first renewable energy source 140. That is, the first renewable energy source 140 may be an energy storage device, and may store (charge) electric power applied from the external electric power supply source 110.

The distribution board 120 may distribute the electric power flowing from the external electric power supply source 110 to apply to a variety of loads such as the indoor electric home appliances 130.

The first renewable energy source 140 may be configured with an electric energy storage (ESS), and store the electric power flowing from the external electric power supply source 110. Also, electric power applied from the second renewable energy source 150 connected to one end of the first renewable energy source 140 may be stored. The first renewable energy source 140 may store electric power applied from the external electric power supply source 110 or the second renewable energy source 150, and may apply the electric power stored therein to the electric home appliance 130 at a predetermined time or a user request time through the distribution board 120. For example, electric power may be stored in the first renewable energy source 140 at a time zone such as a late night at which electric power consumption is less or at a time zone at which a power usage fee is inexpensive, and otherwise, the stored electric power may be discharged to the electric hone appliance 130 at a time zone at which electric power consumption is abruptly increased or at a time zone at which a power usage fee is expensive.

The second renewable energy source 150 may be configured with a solar power generation unit, and the solar power generation unit may convert sunlight incident thereto into electric power to apply the converted electric power to the first renewable energy source 140.

The power metering devices 161, 162, 163, and 164 may be connected to one ends of the external electric power supply source 110, the distribution board 120, the first renewable energy source 140, and the second renewable energy source 150, respectively.

A first power metering device 161 connected to an output end of the external electric power supply source 110 may be configured with at least one module capable of measuring electric energy supplied from the external electric power supply source 110.

A second power metering device 162 connected to an input end of the distribution board 120 may be configured with at least one module capable of measuring electric energy to be used when electric power flowing from the external electric power supply source 110 or the first renewable energy source 140 is supplied to a variety of loads such as the indoor electric home appliances 130. In particular, the second power metering device 162 may measure an electric energy usage pattern of a load in addition to a measurement of electric energy consumption thereof. That is, in addition to the electric energy consumption of the load, the second power metering device 162 may measure electric energy data by including operation state information of the load and electric power consumption pattern information thereof.

A third power metering device 163 connected to one end of the first renewable energy source 140 may be configured with at least one module capable of measuring electric energy data applied from the external electric power supply source 110, and electric energy data for which the electric power stored (charged) in the first renewable energy source 140 is discharged to the distribution board 120.

A fourth power metering device 164 connected to one end of the second renewable energy source 150 may be configured with at least one module capable of measuring electric energy data regarding electric power generated in the second renewable energy source 150.

The second renewable energy source 150 may be connected to the other end of the first renewable energy source 140. In particular, the fourth power metering device 164 may be connected between the first renewable energy source 140 and the second renewable energy source 150 to verify electric energy data applied from the second renewable energy source 150 to the first renewable energy source 140.

With reference to FIGS. 3 to 6, a load power monitoring method applicable to a load power monitoring system according to an embodiment of the present disclosure will be described in detail based on a configuration of the load power monitoring system including the power metering device as described above. Hereinafter, a monitoring method will be described by limiting an order of a data collection, but data may be collected from each of the power metering devices irrelevant to the order of the data connection.

FIGS. 3 to 6 are flow charts of a load power monitoring operation applicable to a load power monitoring system according to an embodiment of the present disclosure.

Figure 3:
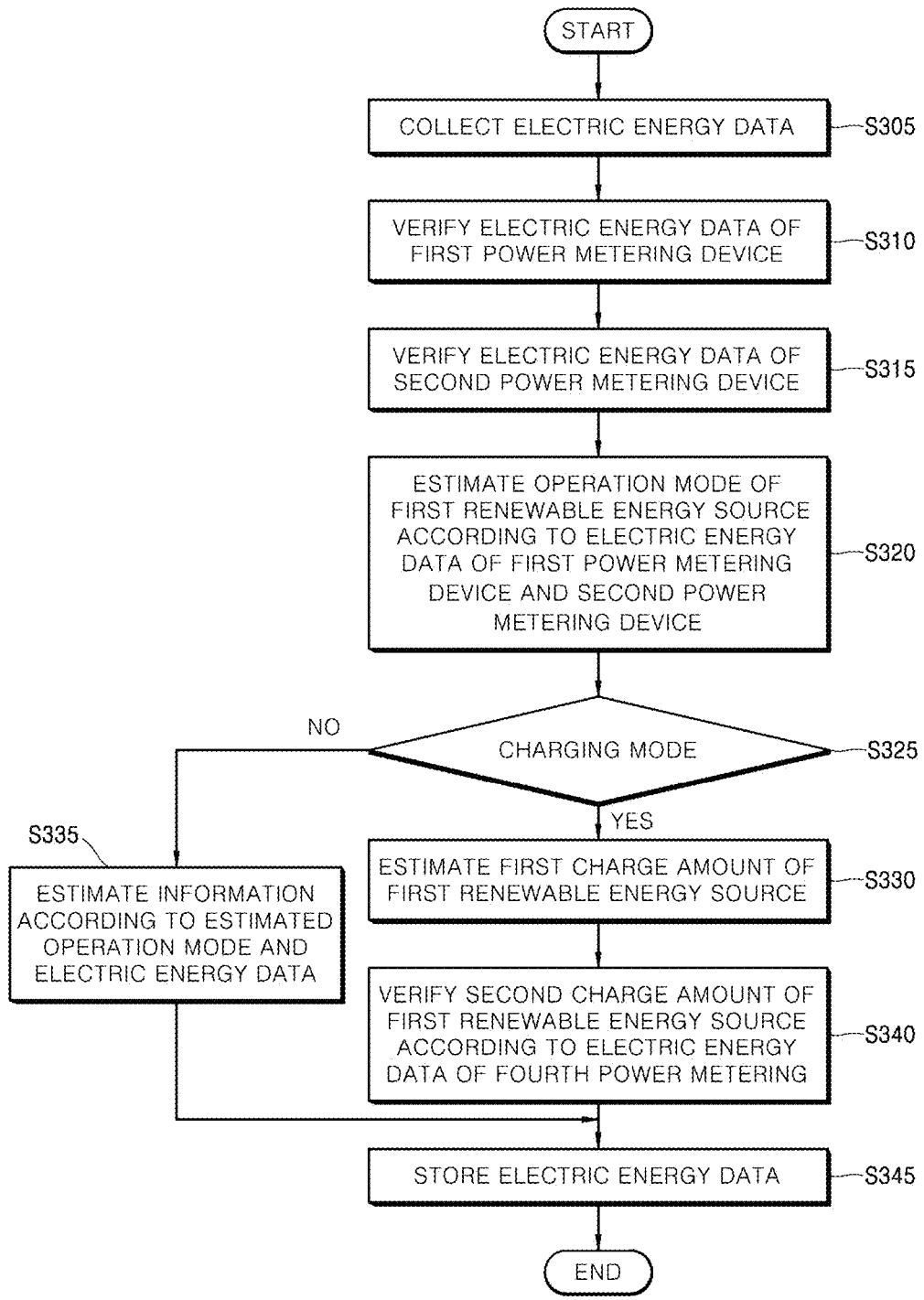
FIGS. 3 to 6 are flow charts of a load power monitoring operation applicable to a load power monitoring system according to an embodiment of the present disclosure.

FIG. 3 is a flow chart of an operation according to a first embodiment for performing a load power monitoring operation when the first renewable energy source operates in a charging mode in the monitoring server 10.

With reference to FIG. 3, the monitoring server 10 may collect electric energy data from the power metering devices 161, 162, 163, and 164 through the communication unit 11 in Operation S305.

The controller 12 of the monitoring server 10 may verify the electric energy data, which is connected through the communication unit 11, of the first power metering device 161 in Operation S310. In particular, the controller 12 may verify first electric energy data including electric energy applied from the external electric power supply source 110.

When the first electric energy data is verified, the controller 12 may verify electric energy data received from the second power metering device 162 in Operation S315. In particular, the controller 12 may verify second electric energy data including information regarding electric power consumption and an electric power consumption pattern which are used in the electric home appliances 130 to which electric power is supplied through the distribution board 120. At this point, information regarding the electric power consumption pattern may be obtained through a non-intrusive load monitoring (NILM) algorithm. The NILM algorithm may analyze electric energy, which is consumed by each of the electric home appliances 130 connected to the distribution board 120, and an electric power usage pattern from the power metering device connected thereto.

When the second electric energy data is verified, the controller 12 of the monitoring server 10 may estimate an operation mode of the first renewable energy source 140 based on the first electric energy data and the second electric energy data in Operation S320. In particular, the controller 12 may compare the first electric energy data with the second electric energy data.

The controller 12 may verify whether the operation mode of the first renewable energy source 140 is a charging mode according to the comparison result in Operation S325. In particular, when the second electric energy data is 0 out of the first electric energy data and the second electric energy data, electric power applied from the external electric power supply source 110 may be estimated to be applied to the first renewable energy source 140 without being applied to the distribution board 120. Consequently, when the second electric energy data is 0 as a result of verifying the first electric energy data and the second electric energy data, the first renewable energy source 140 may be estimated as a charging mode.

Therefore, when the operation mode of the first renewable energy source 140 is verified as the charging mode, the controller 12 may estimate the second electric energy data as first electric energy of the first renewable energy source 140 in Operation S330.

On the other hand, when the first electric energy data and the second electric energy data are verified and then the operation mode of the first renewable energy source 140 is not the charging mode, the controller 12 may estimate information according to an estimated operation mode and electric energy data corresponding to the information in Operation S335.

When the first electric energy of the first renewable energy source 140 is estimated, the controller 12 of the monitoring server 10 may estimate second electric energy of the first renewable energy source 140 in Operation S340. In particular, when receiving and storing electric power generated by the second renewable energy source 150 connected to one end of the first renewable energy source 140, the controller 12 may estimate electric energy data, that is, the second electric energy, applied from the second renewable energy source 150 based on electric energy data (fourth electric energy data) received from the fourth power metering device 164.

The controller 12 of the monitoring server 10 may store information regarding the electric energy data verified by the above operation in the storage unit 13 in Operation S345.

As described above, total charge amount charged in the first renewable energy source 140 may be estimated by a sum of a first charge amount and a second charge amount. Also, through the fourth electric energy data received from the fourth power metering device 164, electric energy generated by the second renewable energy source 150 may be estimated. That is, even though the third power metering device 163 is omitted, a charge amount of the first renewable energy source 140 and an energy generation amount of the second renewable energy source 150 may be estimated and verified.

Figure 4:
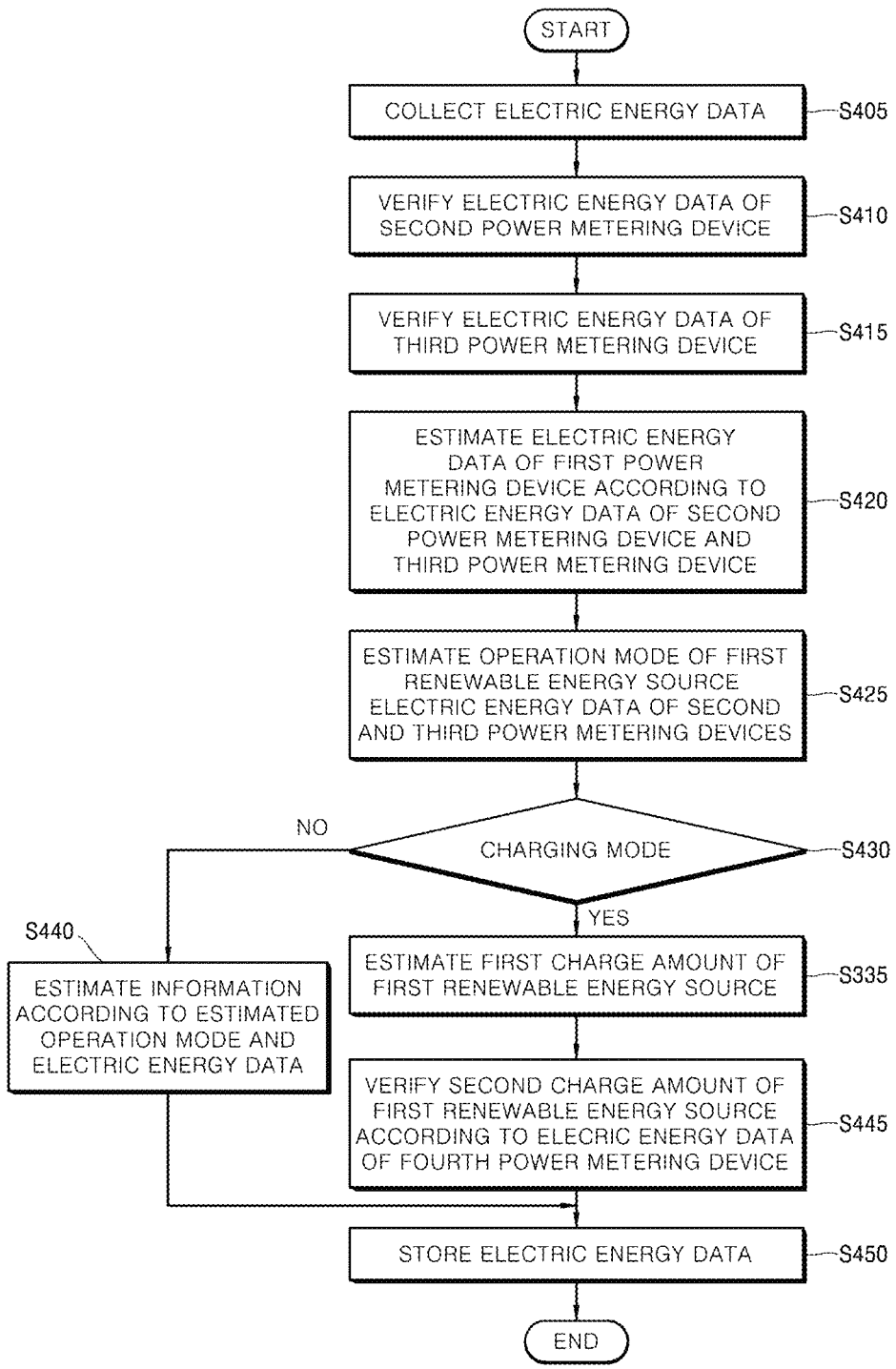

FIG. 4 is a flow chart of an operation according to a second embodiment for performing a load power monitoring operation in the monitoring server 10 when the first renewable energy source operates in a charging mode.

With reference to FIG. 4, the monitoring server 10 may collect electric energy data from the power metering devices 161, 162, 163, and 164 through the communication unit 11 in Operation S405.

The controller 12 of the monitoring server 10 may verify electric energy data applied from the external electric power supply source based on electric energy data received from the second power metering device 162 and collected from the communication unit 11 in Operation S410. In particular, the controller 12 may verify second electric energy data including information regarding electric power consumption and an electric power consumption pattern which are used in the electric home appliances 130 to which electric power is supplied through the distribution board 120. At this point, the information regarding the electric power consumption pattern may be obtained through the NILM algorithm. The NILM algorithm may analyze electric power consumption and an electric power consumption pattern, which are used by each of the electric home appliances 130 connected to the distribution board 120, from the power metering devices connected thereto.

The controller 12 of the monitoring server 10 may verify electric energy data collected from the third power metering device 163 and through the communication unit 11 in Operation S415.

When second electric energy data and third electric energy data are verified, the controller 12 of the monitoring server 10 may estimate electric energy data (first electric energy data) flowing from the eternal electric power supply source 110 by a sum of the second electric energy data and the third electric energy data in Operation S420.

The controller 12 of the monitoring server 10 may estimate an operation mode of the first renewable energy source 140 based on the estimated first electric energy data and the second and third electric energy data in Operation S425. In particular, when the estimated first electric energy data and the third electric energy data are the same as each other, the controller 12 may estimate that electric power applied from the external electric power supply source 110 is not applied to the distribution board 120 and is applied to the first renewable energy source 140. Therefore, when the first electric energy data and the third electric energy data are the same as each other, the controller 12 may determine as a charging mode in Operation S430, and may estimate the first electric energy data as a first charge amount of the first renewable energy source 140 in Operation S435.

On the other hand, when the estimated operation mode of the first renewable energy source 140 is not the charging mode, the controller 12 may estimate information and electric energy data corresponding to the estimated operation mode in Operation S440.

Also, the controller 12 of the monitoring server 10 may estimate a second charge amount of the first renewable energy source based on the received electric energy data from the fourth power metering device 164 in Operation S445. In particular, when receiving and storing electric power generated by the second renewable energy source connected to one end of the first renewable energy source 140, the controller 12 may estimate electric energy data applied from the second renewable energy source 150, that is, a second charge amount based on the electric energy data (fourth electric energy data) received from the fourth power metering device 164.

The controller 12 of the monitoring server 10 may store information regarding the electric energy data verified by the above operation in the storage unit 13 in Operation S450.

As described above, all charge amount charged in the first renewable energy source 140 may be estimated by a sum of the first charge amount and the second charge amount. Also, through the fourth electric energy data received from the fourth power metering device 164, electric energy generated by the second renewable energy source 150 may be estimated. That is, even though the first power metering device 161 is omitted, a charge amount of the first renewable energy source 140 and an energy generation amount of the second renewable energy source 150 may be estimated and verified.

Figure 5:
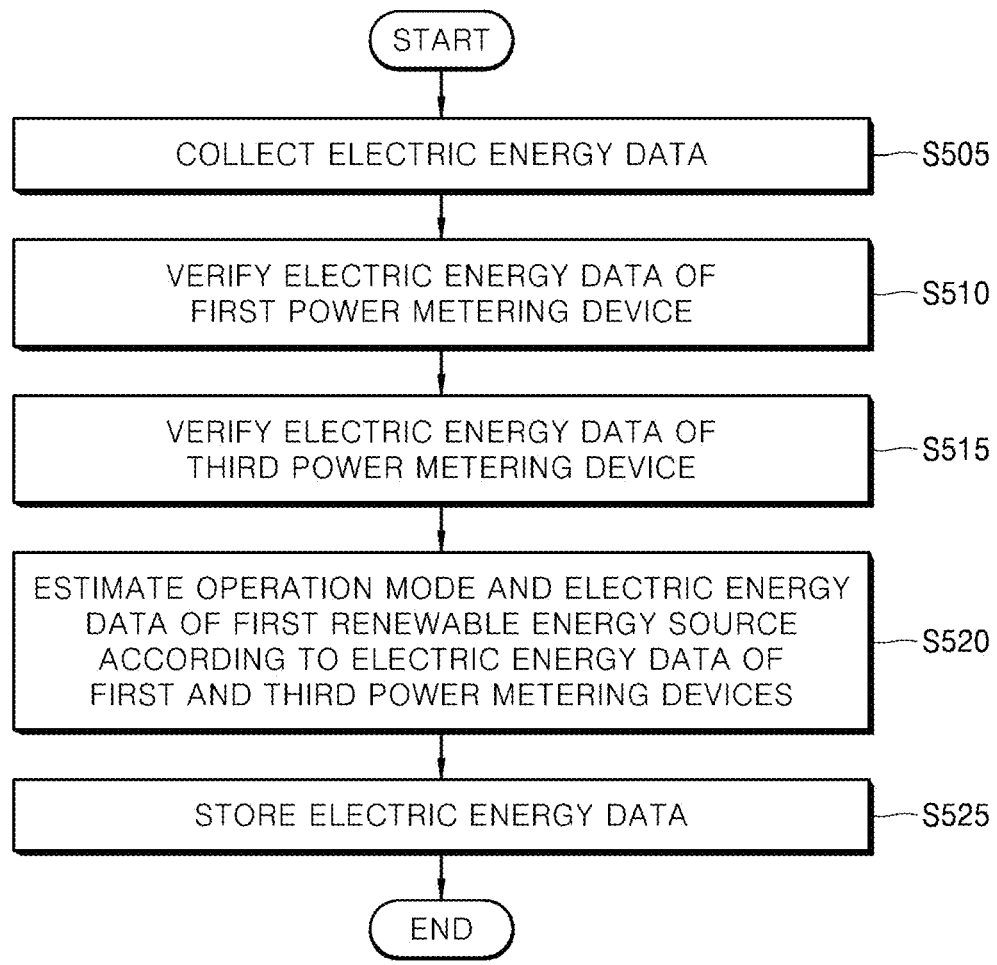

FIG. 5 is a flow chart of an operation according to a first embodiment for performing a load power monitoring operation in the monitoring server 10 when the first renewable energy source operates in a discharging mode and the second renewable energy source does not generate electric power.

With reference to FIG. 5, the monitoring server 10 may collect electric energy data from the power metering devices 161, 162, 163, and 164 through the communication unit 11 in Operation S505.

The controller 12 of the monitoring server 10 may verify electric energy data, which is collected through the communication unit 11, of the first power metering device 161 in Operation S510. In particular, the controller 12 may verify first electric energy data including electric energy applied from the external electric power supply source 110.

When the first electric energy data is verified, the controller 12 may verify electric energy data received from the second power metering device 162 in Operation S515. In particular, the controller 12 may verify second electric energy data including information electric energy consumption and an electric power consumption pattern that are used in the electric home appliances 130 to which electric power is supplied through the distribution board 120. At this point, the information regarding the electric power consumption pattern may be obtained through an NILM algorithm. The NILM algorithm may analyze electric power consumption and an electric power usage pattern of each of the electric home appliances 130 connected to the distribution board 120 from the power metering devices connected thereto.

When the second electric energy data is verified, the controller 12 of the monitoring server 10 may estimate an operation mode of the first renewable energy source 140 and electric energy data according to the operation mode based on the first electric energy data and the second electric energy data in Operation S515. In particular, when the verified second electric energy data exceeds the first electric energy data (the first electric energy data<the second electric energy data), the controller 12 may estimate that the first renewable energy source 140 operates in a discharging mode in which electric power is discharged. Therefore, when the first renewable energy source 140 is estimated to operate in the discharging mode, the controller 12 may estimate a discharge amount of the first renewable energy source 140 by a difference between the second electric energy data and the first electric energy data in Operation S520.

Therefore, the controller 12 of the monitoring server 10 may store information regarding the operation mode and the discharge amount, which are verified by the above operation, of the first renewable energy source 140, the first electric energy data, and the second electric energy data in the storage unit 13 in Operation S525.

Figure 6:
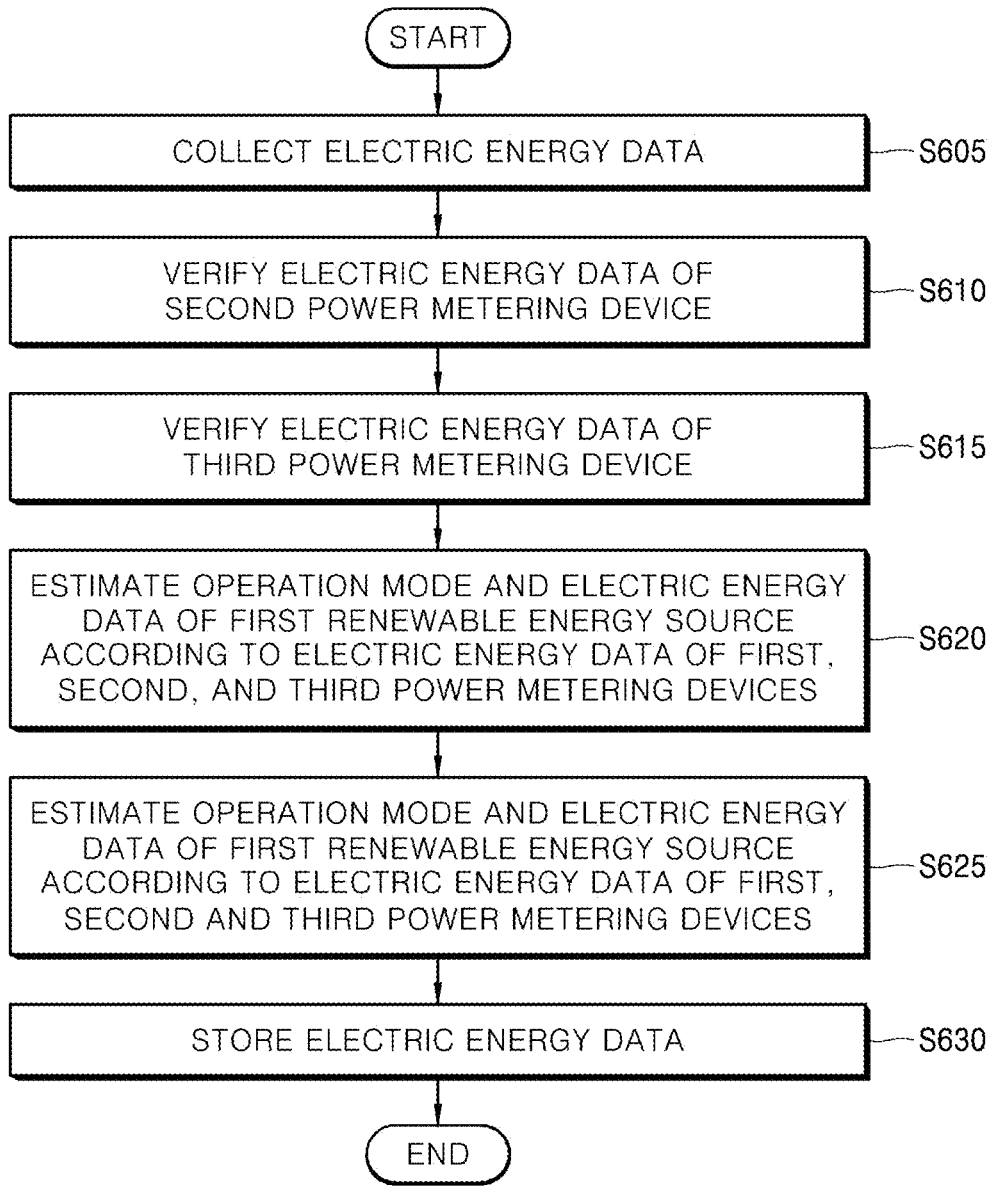

FIG. 6 is a flow chart of an operation according to a second embodiment for performing a load power monitoring operation in the monitoring server 10 when the first renewable energy source operates in a discharging mode and the second renewable energy source does not generate electric power.

With reference to FIG. 6, the monitoring server 10 may collect electric energy data from the power metering devices 161, 162, 163, and 164 through the communication unit 11 in Operation S605.

The controller 12 of the monitoring server 10 may verify electric energy data applied from the external electric power supply source based on electric energy data received from the second power metering device 162 and collected through the communication unit 11 in Operation S610. In particular, the controller 12 may verify second electric energy data including information regarding electric power consumption and an electric power consumption pattern which are used in the electric home appliances 130 to which electric power is supplied through the distribution board 120. At this point, the information regarding the electric energy consumption pattern may be obtained through an NILM algorithm. The NILM algorithm may analyze electric power consumption and an electric power consumption pattern, which are used by each of the electric home appliances 130 connected to the distribution board 120, from the power metering devices connected thereto.

When the second electric energy data is verified, the controller 12 of the monitoring server 10 may verify electric energy data received from the third power metering device 163 in Operation S615.

The controller 12 of the monitoring server 10 may estimate electric energy data applied from the external electric power supply source 110 based on the second electric energy data and third electric energy data in Operation S620. In particular, the controller 12 may estimate the electric energy data (first electric energy data) applied from the external electric power supply source 110 by a sum of the second electric energy data and the third electric energy data.

The controller 12 of the monitoring server 10 may estimate an operation mode of the first renewable energy source 140 and electric energy data (a discharge amount) according to the operation mode based on the first electric energy data, the second electric energy data, and the third electric energy data in Operation S625. In particular, when the sum of the second electric energy data and the third electric energy data is greater than the estimated first electric energy data (the second electric energy data+the third electric energy data>the first electric energy data, the controller 12 may determine that electric energy discharged from the first renewable energy source 140 exists in addition to the electric power flowing from the external electric power supply source 110. Therefore, the controller 12 may estimate that the first renewable energy source 140 operates in a discharging mode.

Consequently, as the first renewable energy source 140 discharges, the controller 12 may estimate a discharge amount of the first renewable energy source 140 based on the electric energy data of the third power metering device 163.

Therefore, the controller 12 of the monitoring server 10 may store information regarding the operation mode and the discharge amount of the first renewable energy source 140, which are verified by the above operation, and regarding the estimated and verified electric power data in the storage unit 13 in Operation S630.

Figure 8:
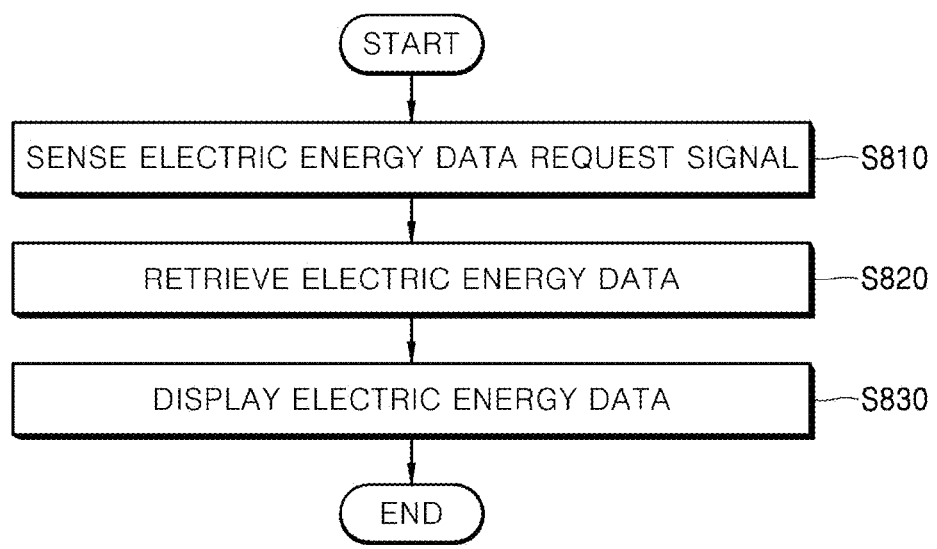
FIG. 8 is a flow chart of a load power monitoring result output operation according to an embodiment of the present disclosure.
Figure 9:
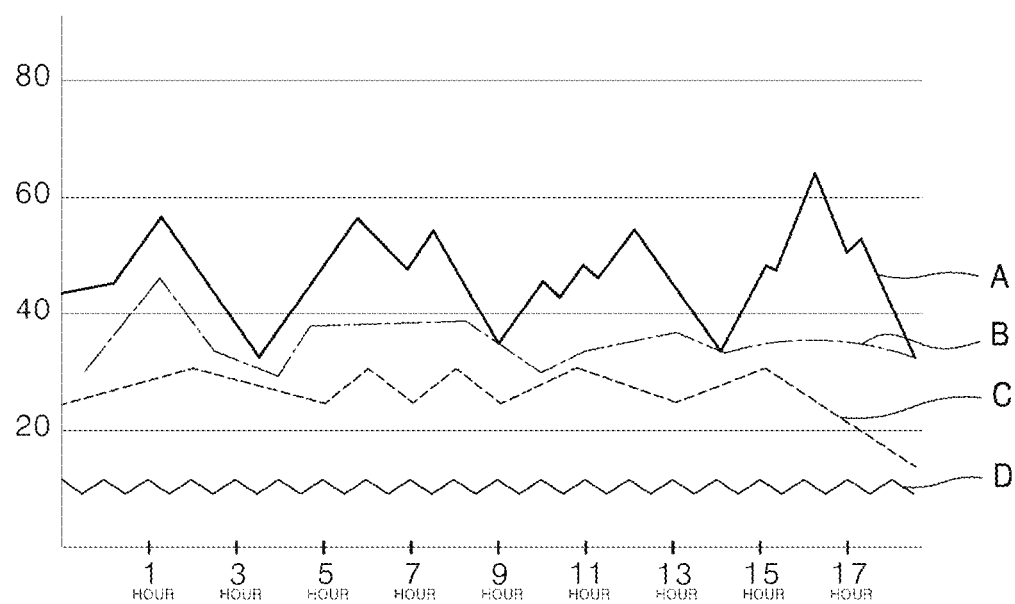
FIG. 9 is an diagram of a load power monitoring result output according to an embodiment of the present disclosure.

FIG. 8 is a flow chart of an operation of a load power monitoring result output according to an embodiment of the present disclosure, and FIG. 9 is an diagram of the load power monitoring result output according to an embodiment of the present disclosure.

An operation for outputting a load power monitoring result stored in the storage unit 13 of the monitoring server 10 according to an embodiment of the present disclosure will be described in detail with reference to FIGS. 8 and 9.

With reference to FIGS. 8 and 9, the controller 12 of the monitoring server 10 may sense an output request signal of the electric energy data, which are measured and obtained according to one embodiment and other embodiment of the present disclosure and stored in the storage unit 13, in Operation S810. The output request signal may be input through a user input unit (not shown), or may be received from a remote terminal and the like by a wired or wireless communication.

The controller 12 of the monitoring server 10 may retrieve the electric energy data stored in the storage unit 13 in Operation S820, and may display the electric energy data in a variety forms such as a graph shown in FIG. 9, a digit, a text and the like in Operation S830. FIG. 9 shows information regarding electric power consumption or a charge mount of each of the electric appliances and the renewable energy source. For example, A to C may be examples of electric power data of the electric home appliances 130, and D may be an example of the renewable energy source 140 or 150. In the electric energy data of the electric home appliances, a period of the electric energy data may be shorter according to a sensing of data required for an NILM analysis.

Although the operations for measuring or estimating the electric energy data in the external electric power supply source 110, the electric home appliances 130 connected to the distribution board 120, the energy storage device 140, or the solar power generation device 150 have been described sequentially, they are not limited to the described operation order, and may be performed in a variety of modifications.

As described above, the power metering device, the load power monitoring system using the same, and an operating method thereof have effectiveness in that high reliability and high performance system may be configured in a minimum cost and load electric energy may be effectively measured using the system.

Although the embodiments have been illustrated and described, the technical concept of the present disclosure is not limited to the specific embodiment described above, and it should be understood that various other modifications can be diversely implemented by those skilled in the art without departing the spirit of the present disclosure defined by the appended claims, and also these modifications should not be construed individually from the technical concept and forecast of the present disclosure.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for monitoring a load power, comprising:
an external electric power supply source;
a first renewable energy source configured to charge or discharge electric power;
a second renewable energy source configured to generate electric power;
a distribution board configured to distribute the electric power applied from the external electric power supply source or the first renewable energy source to an electric device;
a first power metering device configured to sense electric energy of one of the external electric power supply source and the first renewable energy source;
a second power metering device separate from the first power metering device, wherein the second power metering device is configured to sense electric energy distributed to the electric device by the distribution board;
a third power metering device separate from the first and second power metering devices and connected between the first renewable energy source and the second renewable energy source, wherein the third power metering device is configured to sense electric energy applied to the first renewable energy source from the second renewable energy source; and
a monitoring server configured to collect first electric energy data sensed by the first power metering device, second electric energy data sensed by the second power metering device, and third electric energy data sensed by the third power metering device, and monitor the load power based on the collected electric energy data,
wherein the second electric energy data includes information about electric energy applied to the electric device and an electric energy consumption pattern consumed in the electric device,
wherein the monitoring server estimates an operation mode of the first renewable energy source based on the first electric energy data and the second electric energy data, and
wherein the monitoring server estimates a charged amount or a discharged amount of the first renewable energy source based on the estimated operation mode of the first renewable energy source and the third electric energy data,
wherein the charged amount is an amount charged in the first renewable energy source and the discharged amount is an amount discharged from the first renewable energy source, and
wherein the charged amount is a sum of a first charge amount and a second charge amount, wherein when the first renewable energy source operates in a charging mode, the first charge amount is estimated based on the first electric energy data and the second charge amount is estimated based on the third electric energy data.

2. The system of claim 1, wherein the first renewable energy source is an energy storage device, and the second renewable energy source is a solar power generation device.

3. The system of claim 1, wherein the first power metering device is configured to be connected to one end of the first renewable energy source, wherein the second renewable energy source is configured to be connected to the other end of the first renewable energy source.

4. The system of claim 1, wherein the monitoring server is configured to obtain the electric energy consumption pattern from the second electric energy data sensed by the second power metering device through a non-intrusive load monitoring (NILM) algorithm.

5. The system of claim 1, wherein the monitoring server includes:
a communication unit configured to collect the first, second, and third electric energy data;
a controller configured to verify the collected electric energy data;
a storage unit configured to store the first electric energy data, the second electric energy data, the operation mode of the first renewable energy source, and at least one of the charged amount of the first renewable energy source and the discharged amount of the first renewable energy source; and
an output unit configured to output electric energy data stored in the storage unit.

6. A method for monitoring a load power, comprising:
collecting first electric energy data corresponding to one of electric energy applied from an external electric power supply source or electric energy charged to or discharged from a first renewable energy source, second electric energy data corresponding to electric energy distributed to an electric device by a distribution board, and third electric energy data corresponding to electric energy applied to the first renewable energy source from the second renewable energy source;

verifying the collected electric energy data;

estimating an operation mode of the first renewable energy source based on the first electric energy data and the second electric energy data;

estimating a charged amount or a discharged amount of the first renewable energy source based on the operation mode of the first renewable energy source and the third electric energy data; and storing the first electric energy data, the second electric energy data, the operation mode of the first renewable energy source, and at least one of the charged amount of the first renewable energy source and the discharged amount of the first renewable energy source, wherein the second electric energy data includes information regarding electric energy data flowing from the external electric power supply source, electric energy data applied from the renewable energy source, electric energy data applied to the electric device through a distribution panel, and electric energy data consumed in the electric device, wherein the charged amount is an amount charged in the first renewable energy source and the discharged amount is an amount discharged from the first renewable energy source, and wherein the charged amount is a sum of a first charge amount and a second charge amount, wherein when the first renewable energy source operates in a charging mode, the first charge amount is estimated based on the first electric energy data and the second charge amount is estimated based on the third electric energy data.

7. The method of claim 6, further comprising verifying the electric energy data through the distribution panel based on electric energy consumption pattern information of the electric device.

8. The method of claim 6, wherein if the first electric energy data corresponds to the electric energy charged to or discharged from the first renewable energy source, the method further comprises:

estimating electric energy data corresponding to the electric energy applied from the external electric power supply source based on the first and second electric energy data, and estimating the electric energy data corresponding to the electric energy applied from the external electric power supply source to be a sum of the first and second electric energy data.

9. The method of claim 6, wherein if the first electric energy data corresponds to the electric energy applied from the external electric power supply source, in the step of estimating the charged amount or the discharged discharge amount of the first renewable energy source, when the first renewable energy source operates in the discharging mode, the discharged amount is estimated to be a difference between the first electric energy data and the second electric energy data.

10. The system of claim 1, wherein the first power metering device is configured to sense electric energy of the external electric power supply source and the monitoring server is configured to:

estimate that the first renewable energy source operates in a charging mode when the second electric energy data indicates 0, and estimate that the first renewable energy source operates in a discharging mode when the second electric energy data is larger than the first electric energy data.

11. The system of claim 10, wherein the monitoring server is configured to:

estimate the discharged amount to be a difference between the first electric energy data and the second electric energy data when the first renewable energy source operates in the discharging mode.

\* \* \* \* \*